(12) United States Patent
Gurner

(10) Patent No.: US 8,263,166 B2
(45) Date of Patent: Sep. 11, 2012

(54) IN-SHELL EGG SCRAMBLER AND METHOD OF USING SAME

(75) Inventor: Assaf Gurner, Tel Aviv (IL)

(73) Assignee: Eggnology Ltd., Kfar Sava (IL)

( * ) Notice: Subject to any disclaimer, the term of this patent is extended or adjusted under 35 U.S.C. 154(b) by 222 days.

(21) Appl. No.: 12/598,399

(22) PCT Filed: May 6, 2008

(86) PCT No.: PCT/IL2008/000616

§ 371 (c)(1),
(2), (4) Date: Jan. 9, 2010

(87) PCT Pub. No.: WO2008/139450

PCT Pub. Date: Nov. 20, 2008

(65) Prior Publication Data

US 2010/0112183 A1 May 6, 2010

(51) Int. Cl.
*A23L 1/32* (2006.01)

(52) U.S. Cl. ............ 426/614; 426/519; 99/485; 99/486; 99/348

(58) Field of Classification Search .................. 426/614, 426/519; 99/485, 486, 348
See application file for complete search history.

(56) References Cited

U.S. PATENT DOCUMENTS

| | | | | |
|---|---|---|---|---|
| 2,316,861 A | * | 4/1943 | Hansen | 416/31 |
| 2,760,763 A | * | 8/1956 | Harper | 99/485 |
| 3,232,413 A | * | 2/1966 | Niederer et al. | 198/373 |
| 3,241,433 A | * | 3/1966 | Niederer, Jr et al. | 356/57 |
| 3,796,512 A | * | 3/1974 | Djuvik | 416/202 |
| 4,184,422 A | * | 1/1980 | Grise et al. | 426/519 |
| 4,264,216 A | * | 4/1981 | Stansbury, Jr. | 366/343 |
| 5,589,211 A | * | 12/1996 | Cox et al. | 426/298 |

FOREIGN PATENT DOCUMENTS

| | | | |
|---|---|---|---|
| JP | 11-346720 | * | 12/1999 |
| KR | 2004-107860 | * | 12/2004 |

OTHER PUBLICATIONS

English translation for JP 11-346720, published Dec. 1999, http://www4.ipdl.inpit.go.jp.*
English translation for KR 2004-107860, published Dec. 2004, http://kposd.kipo.go.kr:8088/up/kpion/.*

* cited by examiner

*Primary Examiner* — Anthony Weier
(74) *Attorney, Agent, or Firm* — Lowe Hauptman Ham & Berner LLP

(57) ABSTRACT

An in-shell-scrambled-egg is shown. The scrambled egg includes a natural poultry natural egg wherein the nested layers of the egg are scrambled and the shell of the egg is unbroken. In addition an in-shell egg scrambler is also shown and includes a rotation unit operatively connected to an egg retention portion designed adapted to rotate the egg retention portion such that an egg retained therein is scrambled without breaking the shell thereof. The egg rotation can be controlled by a controller and a sensor can recognize that the egg is scrambled.

15 Claims, 6 Drawing Sheets

IN-SHELL EGG SCRAMBLER AND METHOD OF USING SAME

RELATED APPLICATIONS

The present application is national phase of PCT/IL2008/000616 filed May 6, 2008, and claims priority from U.S. application Ser. No. 60/924,362 filed May 10, 2007, the disclosures of which are hereby incorporated by reference herein in their entirety.

FIELD OF THE INVENTION

The present invention relates to an in-shell-scrambled-egg, a device and method for scrambling a poultry egg within its shell. In particular, it relates to devices and methods for scrambling a poultry egg within its shell without damaging the structural integrity of the shell. In addition, it relates to an egg prepared with such a device or by such a method.

BACKGROUND OF THE INVENTION

Poultry eggs are a dietary staple in many parts of the world. A whole egg in its natural state typically comprises several nested layers. The outer layer is a rigid shell, which surrounds a shell membrane, which surrounds thin albumen, which surrounds thick albumen, which surrounds a yolk, although in rare cases more than one yolk, or none at all, may be present in an egg. The yolk is separated from the thick albumen by a vitelline membrane, which holds the contents of the yolk. Other features, such as an air cell, two chalazae which anchor the yolk within the albumen, and a germinal disk may be present.

Typically, the shell is broken open, and the thin albumen, thick albumen, and yolk, which hereinafter will be referred to collectively as the edible portions of the egg, are removed therefrom to be eaten, either raw or after cooking. Alternatively, the entire egg may be heated within the shell, e.g., through backing or boiling, subsequent to which the cooked edible portions of the egg are removed and consumed.

One common technique for preparing a cooked egg involves mixing the layers of the edible portion of the egg prior immediately after removal from the shell, and mixing the layers together, e.g., with a whisk or a fork. This mixing is commonly referred to as scrambling. The egg is then cooked in a skillet. An egg thus prepared is commonly referred to as a "scrambled egg."

Another common technique for preparing a cooked egg involves placing the entire egg in boiling water for 10-18 minutes (depending on the size of the egg and cooking conditions). Upon removal from the shell, the edible portions of the egg are solid and retain the general shape of an egg. An egg prepared by this method is commonly referred to as "hard boiled." The edible portions of the egg are typically distinguishable and separable from one another (in particular the thick albumen and the yolk) in a hard boiled egg when cut open. Thus, people who favor one part of the egg over another may selectively consume only part of the egg, thereby being denied the nutritional benefits of the entire egg.

It would be useful if an egg could be provided scrambled within its intact shell. Such an egg is useful in pastry preparation, large volumes food preparation, food factories and restaurants. Moreover, individuals, especially children, who dislike the white or the yolk separately, may enjoy the full nutritional value of the whole egg.

The present invention provides an egg that is already scrambled within its shell. Obviously, without causing any harm to the shell that remains unbroken. The present invention also provides a method and a device for preparing such an egg.

U.S. Pat. No. 5,589,211 to Cox et al. "Method for Processing Poultry Shell Egg" deals with time at temperature methods of treating whole eggs which make them safer to eat without affecting the functionality or organoleptic properties of the eggs. During the process, that is disclosed in this patent, the egg is a slightly scrambled, but the process includes heating that affects the egg and the scrambling is partial i.e., the egg is not homogenously scrambled.

SUMMARY OF THE INVENTION

The present invention provides an in-shell-scrambled-egg, a method for preparing such egg and an in-shell egg scrambler. The in-shell egg scrambler operation is based on the method, in which the egg is rapidly accelerated and rotated or by alternating the rotation process clockwise and counter-clockwise either in short pulses or through longer pulses. The egg's inside process is combined of two stages, breaking the membranes between the layers then stirring and mixing the components.

Preferably, the egg should be rotated on its axis, however it is also possible to obtain satisfactory results when spinning the egg in a more orbital rotation e.g., placing a plurality of eggs in a container and spinning the container.

According to the principles of the present invention an in-shell-scrambled-egg is provided comprised of a natural poultry natural egg wherein the nested layers of said egg are scrambled and the shell of said egg is unbroken.

According to a preferred embodiment the in-shell-scrambled-egg is provided, wherein the nested layers are scrambled homogeneously.

According to another aspect of the present invention it provides an in-shell egg scrambler, comprising a rotation unit operatively connected to an egg retention portion designed to rotate the egg retention portion such that an egg retained therein is scrambled without breaking the shell thereof.

According to a preferred embodiment of the in-shell egg scrambler, it further includes receptacle-directed force on the egg in order to eliminate slippage between the egg and the receptacle and/or to prevent egg's breakage by the vibrations and other physical forces during the spin. Preferably, a soft material of any type (foam Etc.) is used to prevent the egg from breaking.

The rotation unit spins the egg retention portion, with the egg retained therein, by repeatedly accelerating the rotation from static to a predetermined velocity then stopping, for a predetermined times or until the retained egg is scrambled.

According to another preferred embodiment of the in-shell egg scrambler is provided wherein the rotation unit spins the egg retention portion alternately clockwise and anticlockwise.

According to another preferred embodiment of the in-shell egg scrambler is provided wherein the egg retention portion is a chuck with a plurality of adjustable jaws.

According to another preferred embodiment of the in-shell egg scrambler, it is further includes a controller operative for activating the rotation unit according to a predetermined times, maximal velocity and directions.

According to yet another preferred embodiment of the in-shell egg scrambler, it further includes a sensor for recognizing that the retained egg is scrambled.

According to another preferred embodiment the in-shell egg scrambler with a sensor is provided wherein the sensor is comprised of an illumination source located near said egg's shell and a light sensor located near the next side egg's shell, sensing the transparency change of the egg or the light color changes of the light, which is transmitted through the egg from the illumination source.

According to another preferred embodiment the in-shell egg scrambler further includes a controller for activating the rotation unit according to a predetermined routine and stops the rotation unit when the sensor recognizes that the egg is scrambled.

According to yet another preferred embodiment the in-shell egg scrambler is provided, wherein the rotation unit spins the egg retention portion at a rate between 1500-4000 rpm and rapidly stops the rotation unit.

According to another aspect of the present invention a method for scrambling an egg within its shell is provided, comprised of rotating the egg rapidly.

The method for scrambling an egg within its shell is also provided, wherein the rotation is performed by repeatedly accelerating the rotation from static to a predetermined velocity then stopping, for predetermined times or until the egg is scrambled. The rotation could be done alternately clockwise and anticlockwise.

The method for scrambling an egg within its shell is also provided wherein a controller is used for activating rotation according to a predetermined times, maximal velocity and directions. Moreover, a sensor can be used for recognizing that the egg is scrambled.

The method for scrambling an egg within its shell is also provided with the usage of an illumination source that is located near the egg's shell and using the sensor, that is located near the next side of the egg's shell, for sensing the change in transparency of the egg or the light color changes of the light, which is transmitted through the egg from the illumination source.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the figures.

DETAILED DESCRIPTION OF EMBODIMENTS

Figure 1:
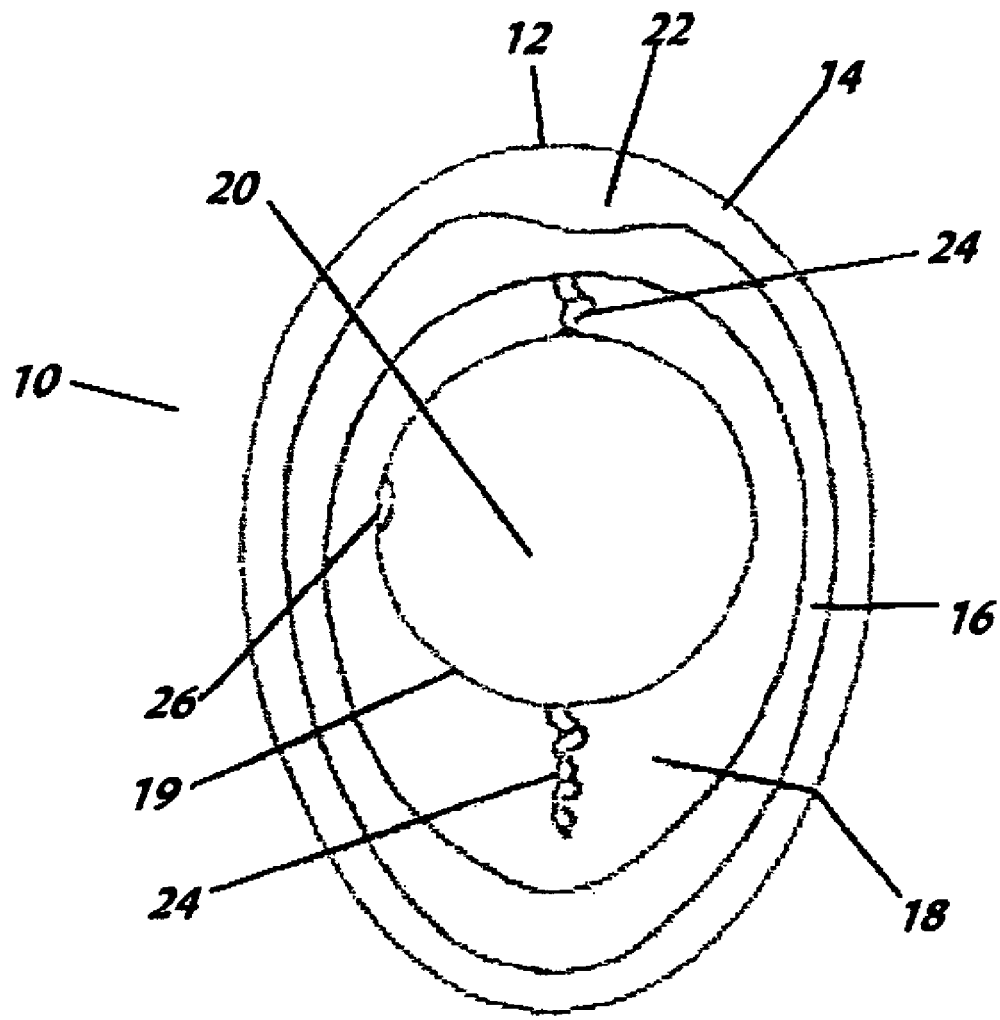
FIG. 1 illustrates a cross-sectional view of a typical poultry egg.

Poultry eggs are a dietary staple in many parts of the world. As illustrated in FIG. 1, a whole egg 10 in its natural state typically comprises several nested layers. The outer layer is a rigid shell 12, which surrounds a shell membrane 14, which surrounds a thin albumen 16, which surrounds a thick albumen 18, which surrounds a yolk 20, although in rare cases more than one yolk, or none at all, may be present in an egg. The yolk 20 is separated from the thick albumen 18 by a vitelline membrane 19, which holds the contents of the yolk. Other features, such as an air cell 22, two chalazae 24 which anchor the yolk 20 within the albumen, and a germinal disk 26 may be present.

Typically, the shell 12 is broken open, and the thin albumen 16, thick albumen 18, and yolk 20, are removed to be eaten, either raw or after cooking. Alternatively, the entire egg may be heated within the shell, e.g., through baking or boiling, subsequent to which the cooked edible portions of the egg are removed and consumed.

Figure 2A:
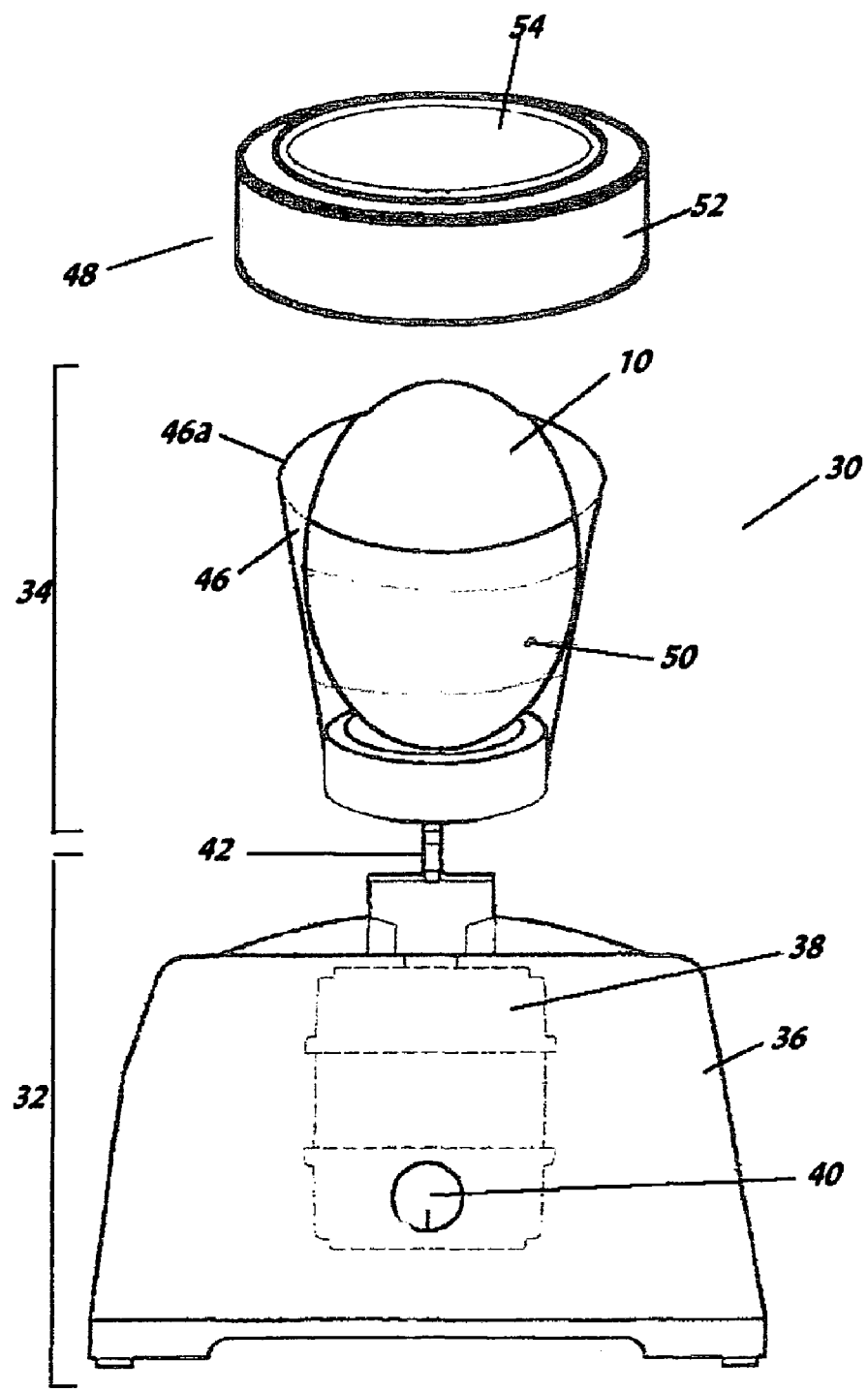
FIGS. 2A and 2B illustrate according to one example, in open and closed positions, respectively.

As illustrated in FIG. 2A, there is provided an in-shell-egg-scrambler, which is generally indicated at 30. The scrambler 30 is illustrated with an egg 10 therein, and comprises a base 32 and an egg retention portion 34, and is designed to have a success-rate of in-shell scrambled eggs which approaches 100%.

The base 32 comprises a rigid housing 36 which contains therein a rotation unit 38 which is activated by an external control mechanism 40, such as a switch or a dial. The rotation unit 38 is operationally connected to the egg retention portion 34, e.g., by an axle 42.

The rotation unit 38 comprises a motor which is designed to rotate the egg retention portion 34 while containing an egg at a rate which is between 1500-4000 rpm, and to come to a rest state (i.e., 0 rpm) very rapidly. Therefore, the rotation unit 38 further comprises a braking mechanism (not illustrated) to rapidly stop the rotation, and a clutch mechanism (not illustrated) to disengage the motor from the axle during braking. It may further be adapted to reach this speed rapidly. In addition, it may be adapted to carry out a "rapid start/stop cycle", i.e., to alternate between a rotation at this rate (i.e., 1500-4000 rpm) and being in a resting state very rapidly, such as several times a second. In order for the rate of rotation of the egg retention portion 34 to match that of the motor, the coupling between the two must be very strong, i.e., minimal or no slippage should be allowed between the motor and the axle 42 on one hand, and between the axle and the egg retention portion on the other hand. The rotation may be performed without vibrating the egg.

The egg retention portion 34 comprises a receptacle 46, adapted to firmly receive therein an egg 10, and a cover, which is generally indicated at 48.

The receptacle 46 is constructed such that the egg 10 rotates therewith with minimal or no slippage (i.e., such that the angular velocity of the egg matches that of the receptacle at all times). This may be due to its physical construction, or due to the material or materials used on the inside thereof. For example, a viscoelastic material or an deflatable inflatable sac (such as to adjust for the size of different eggs) may be used for this purpose, either covering the entire inside surface, or the portion thereof likely to come in contact with an egg retained therein, as indicated by the area indicated at 50.

The cover 48 comprises an outer portion 52 and an inner egg restraint 54. The outer portion 52 is adapted to engage the receptacle 46 and thereby keep the cover removably affixed thereto, especially during use of the scrambler 30. For example, it may be adapted to attach (e.g., by a pressure fit) an upper rim 46a of the receptacle 46, for example by having a viscoelastic inside, or it may comprise threading, so that it may engage a correspondingly threaded receptacle (not shown) by screwing.

Figure 2B:
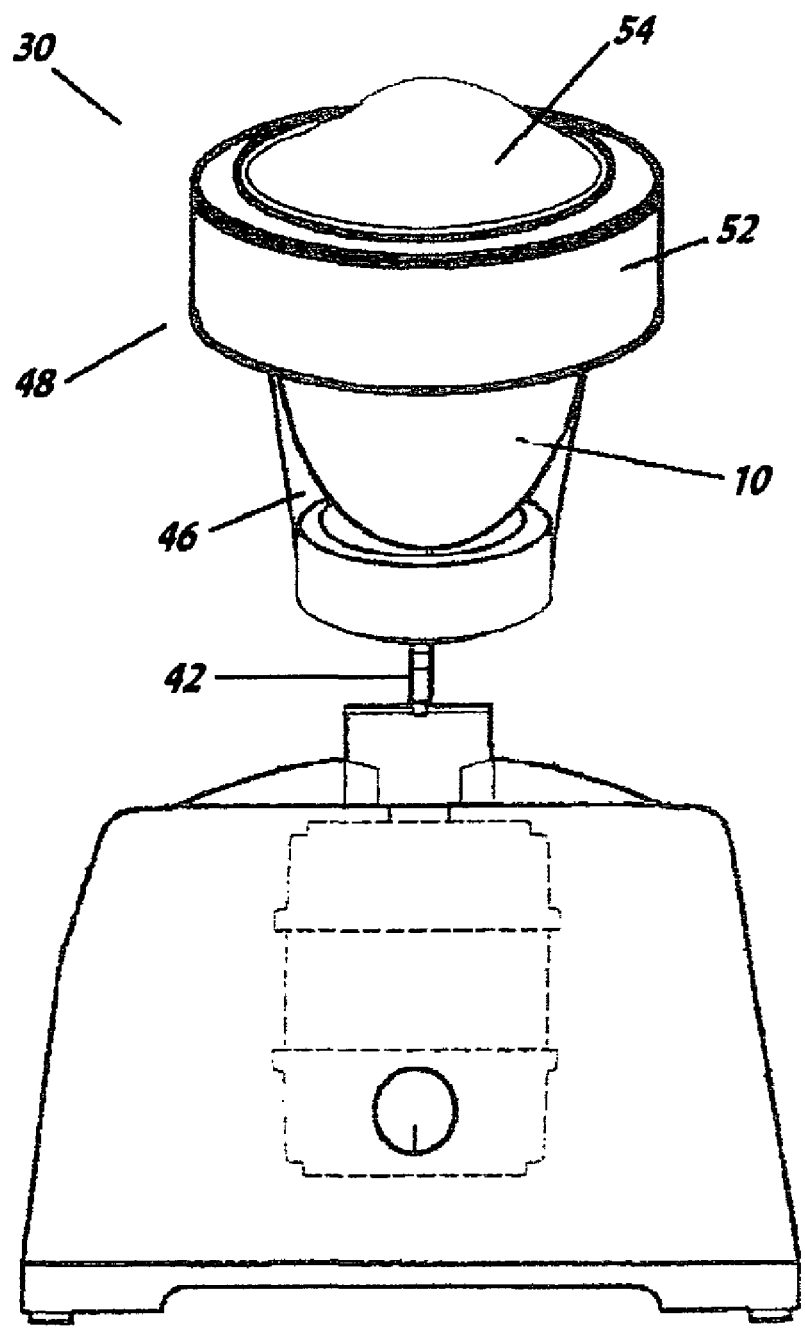

The inner egg restraint 54 may be, e.g., a viscoelastic diaphragm which yields to a portion of the egg 10 which projects beyond the upper end 46a of the receptacle 46. When the cover 48 is engaged with the receptacle 46, as illustrated in FIG. 2B, it provides a receptacle-directed force on the egg 10. This helps reduce and/or eliminate slippage between the egg and the receptacle. In addition, it prevents the egg from vibrating due to any eccentricity in its revolution, which may otherwise lead to shattering of the shell during use of the scrambler.

Figure 3:
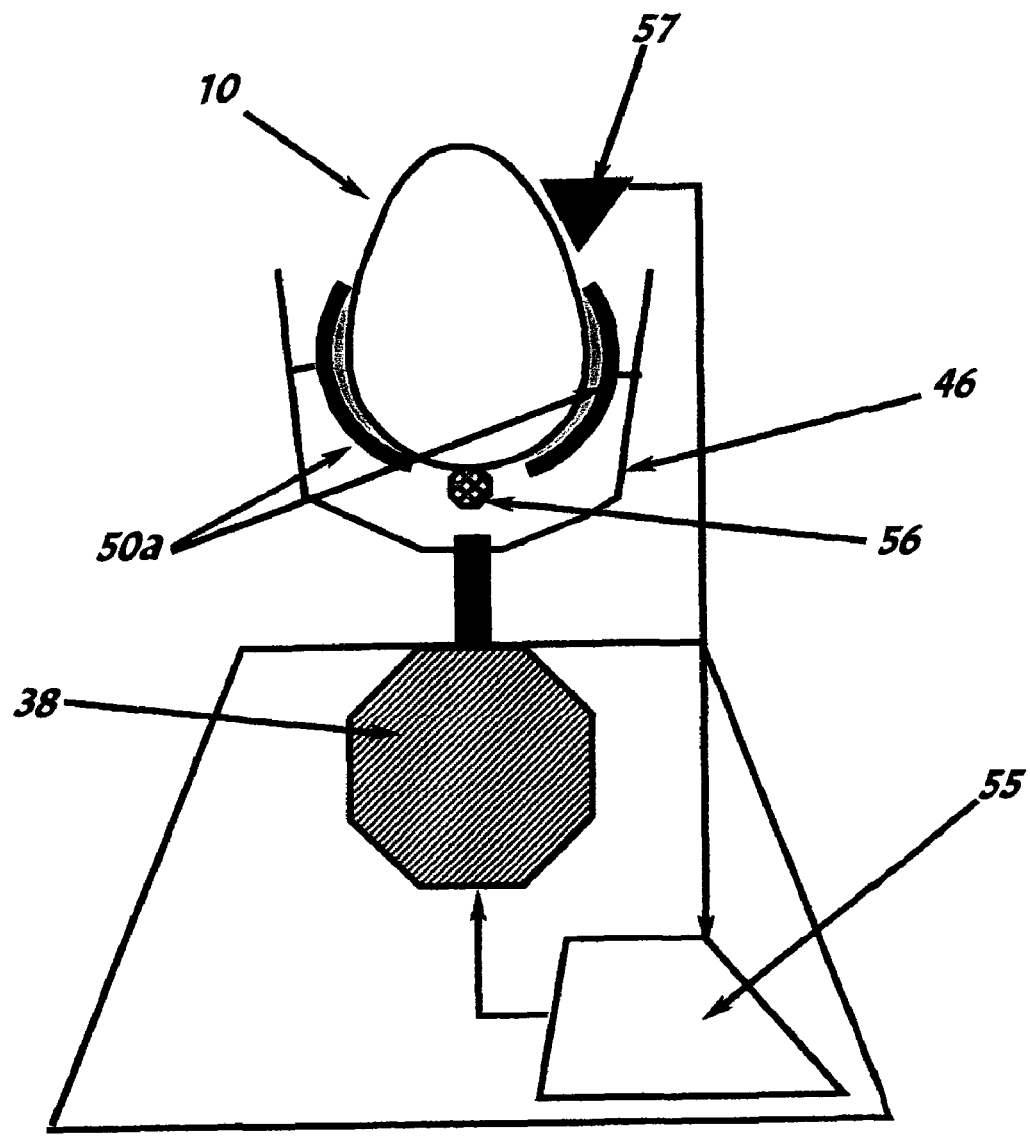
FIG. 3 illustrates an in-shell-egg-scrambler with a controller and a sensor.

FIG. 3 illustrates a cross section of another embodiment of the scrambler, according to the present invention, in which the egg retention portion is a chuck with plurality of adjustable jaws. The scrambler includes a controller and a sensor with light source.

In this illustrated embodiment the egg retention component 46 is a chuck with several adjustable jaws 50a capable of being adjusted to hold any size of egg 10. Moreover, this embodiment has a controller 55 that controls the rotating unit 38. The controller 55 can be programmed to rotate the retention unit 46 according to direction, velocity, duration and/or to stop the retention unit 46 when the sensor 57 recognizes that the egg 10 is scrambled. The sensor 57 recognizes that the egg 10 is scrambled according the light from the light source 56 that is transmitted through the egg 10. When the egg 10 is scrambled its transparency is changed and the color of the pass-through light is changed.

Figure 4:
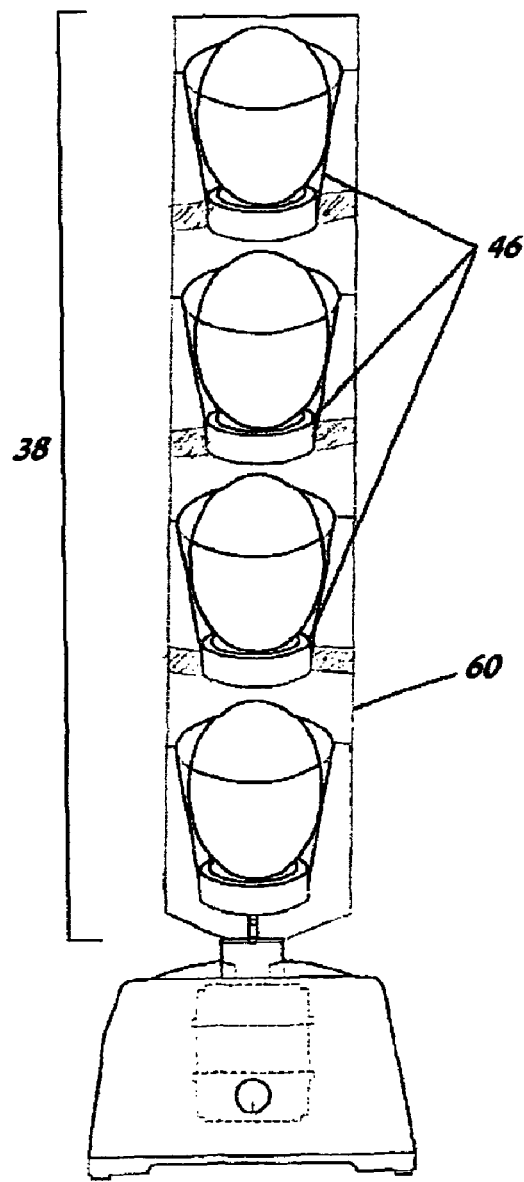
FIG. 4 illustrates an in-shell-egg-scrambler, designed for scramble plurality of eggs at once.
Figure 5:
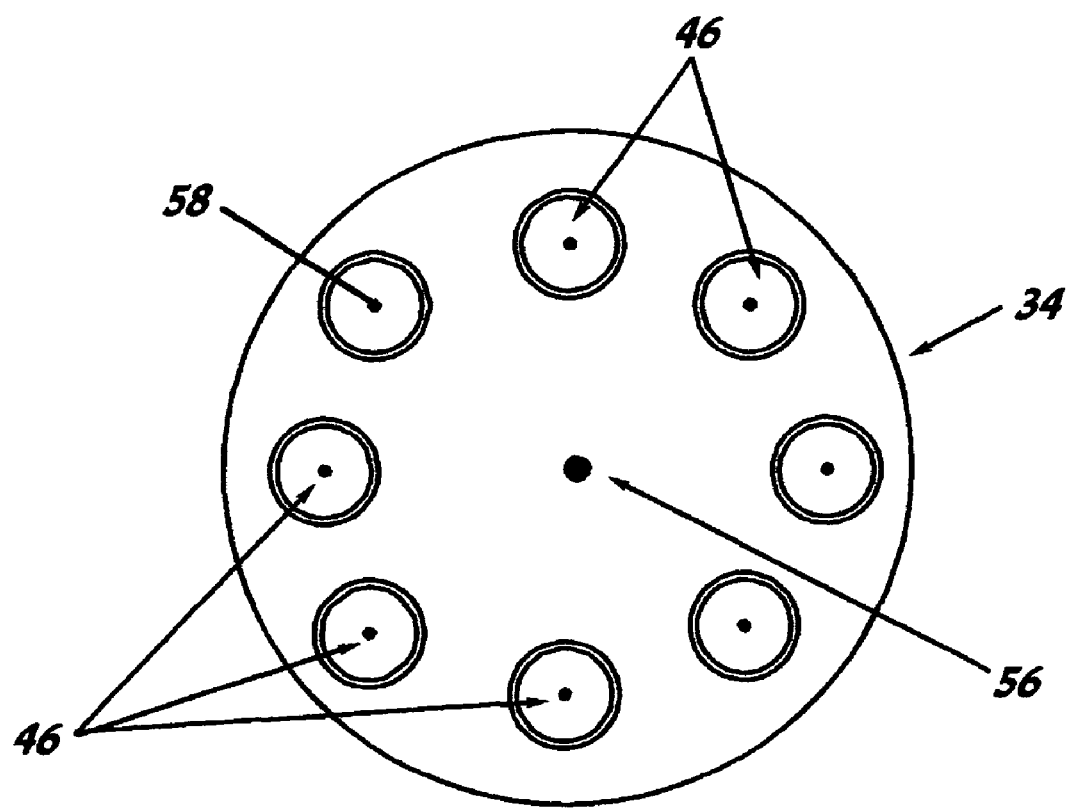
FIG. 5 illustrates another embodiment of an in-shell-egg-scrambler that is designed for scramble plurality of eggs at once.

It will be appreciated that the egg scrambler 10, as illustrated in FIGS. 2A, 2B and 3, is but one non-limiting example of a single-egg scrambler. In practice, other embodiments of the scrambler are possible without departing from the spirit and scope of the invention. For example, as illustrated in FIG. 4, several receptacles 46 may be stacked, e.g., within a receptacle column member 60. Alternatively, as illustrated in FIG. 5, the egg retention portion 34 may comprise several receptacles 46, and thus be adapted to scramble several eggs at once. The entire egg retention portion 34 may be adapted to rotate, as described above, about it central axis 56, and/or each receptacle 46 may be adapted to rotate about its own central axis 58. These two embodiments may be combined, so that a stack of egg retention portions 34 as illustrated in FIG. 5 are provided, rotated by a single rotation unit 38 (not illustrated).

In use, a user places an egg in the receptacle 46 and secures the cover 48 thereto, such that the egg is firmly held within the closed receptacle. When the egg is so positioned, its rotational speed substantially matches that of the receptacle 46, at least within the operating speed and rate of rotational acceleration/deceleration of the motor. The rotation unit 38 is activated, and the motor performs the "rapid start/stop cycle" for a predetermined amount of time or for a predetermined number of cycles. 10-20, or 15-20, or any other appropriate number, of these cycles may take place. During the "rapid start/stop cycle," the direction of rotation of the egg may be the same for all rotations, or it may change, e.g., the direction of rotation may alternate between clockwise and counterclockwise during the cycle. Alternatively, the motor may rotate the egg at 7,000-20,000 rpm for up to about one minute. During this cycle, membranes which separate the various layers of the egg, such as between the vitelline membrane 19, break down due to the shear forces which result due to the "rapid start/stop cycle". Subsequently, the layers of the egg, such as the yolk and the albumen layers, mix together. The egg is thus scrambled within its shell, without the shell being broken.

Scrambling an egg in this way, wherein the shell is not broken, has several advantages. For example, the egg may be easily stored after scrambling, giving it a shelf-life similar to that of an unscrambled egg. Thus, an in-shell scrambled egg may be provided. Since the shell is not punctured, no air is introduced therein, which results in reduced or no foaming of the egg during scrambling as compared to what would occur if the egg were punctured before or during scrambling. In addition, such an egg may be hard-boiled in a shorter amount of time than it would take to scramble a non-scrambled egg, and a hard-boiled egg scrambled in its shell has a unique flavor which is different from a traditional (i.e., non-scrambled) hard-boiled egg. In addition, as there is no separate yolk and albumen, or white, portion of the hard-boiled egg, people who, for reasons of personal preference, do not eat one of these portions, may eat the entire egg, thereby gaining the nutritional benefit therefrom. When preparing, an omelet or a scrambled egg, the egg may be opened directly into a skillet, without having to scramble it first, which could result in spilled egg and/or additional utensils that must be washed. Therefore, using a scrambler such as disclosed herein would be advantageous, inter alia, for institutions or the like which must scramble a large number of eggs, i.e., cafeterias, hospitals, industry, etc.

The inside of the egg, i.e., the yolk and albumen layers, when scrambled in this way, may have a substantially homogenous appearance. For example, almost no "pockets" of darker or lighter material would be found therein, which leads to a more aesthetically pleasing egg, for example when hard-boiled.

After the egg has been scrambled, its appearance, when illuminated from behind with a bright, e.g., halogen, lamp is different from that of a non-scrambled egg. While a non-scrambled egg may have a substantially orange- or yellow-like appearance when so illuminated, an egg scrambled in the shell would appear darker, and have a red-like in color when so illuminated. This characteristic may be used as a basis for designing a quality control system, for example in a multiple-egg scrambler installation. The eggs, after scrambling (i.e., after the process described above has been carried out), are passed through a quality control system with an illumination source on one side of the egg, and a sensor at the other, positioned so as to detect the light from the illumination source via the egg. The sensor, and/or any associated software/hardware, determines whether and/or to what extent the egg has been scrambled, based on the color of the light which passes through the egg, and/or based on the opacity of the egg.

While typically chicken eggs are consumed by people, the egg-scrambler according to any of the disclosed embodiments may be adapted to retain and scramble any other variety of poultry egg.

Although the invention has been described in conjunction with specific embodiments thereof, it is evident that many alternatives, modifications and variations will be apparent to those skilled in the art; accordingly, it is intended to embrace all such alternatives, modifications and variations that fall within the spirit and broad scope of the appended claims.

What is claimed is:

1. An in-shell egg scrambler, comprising
a rotation unit operatively connected to an egg retention portion designed to rotate said egg retention portion such that an egg retained therein is scrambled without breaking the shell thereof, and
a sensor for recognizing that said retained egg is scrambled.

2. The in-shell egg scrambler of claim 1, further comprising a receptacle configured to provide receptacle-directed force on the egg in order to eliminate slippage between the egg and the receptacle.

3. The in-shell egg scrambler of claim 1, wherein said rotation unit is configured to spin said egg retention portion, with said egg retained therein, by repeatedly accelerating the rotation from static to a predetermined velocity then stopping, for a predetermined amount of time or until said retained egg is scrambled.

4. The in-shell egg scrambler of claim 3, wherein said rotation unit spins said egg retention portion alternately clockwise and anticlockwise.

5. The in-shell egg scrambler of claim 1, wherein said egg retention portion is a chuck with a plurality of adjustable jaws.

6. The in-shell egg scrambler of claim 1, further comprising a controller operative for activating said rotation unit according to a predetermined amount of time, maximal velocity and direction.

7. The in-shell egg scrambler of claim 1, wherein said sensor comprises
   an illumination source, and
   a light sensor to sense a transparency change of said egg or a light color change of the light which is transmitted through said egg from said illumination source;
   wherein
   the illumination source configured to be located near one side of said egg's shell and
   the light sensor configured to be located near another side of said egg's shell to detect a light from the illumination source through the egg.

8. The in-shell egg scrambler of claim 1, further comprising a controller operative for activating said rotation unit according to a predetermined routine and stops said rotation unit when said sensor recognizes that said egg is scrambled.

9. The in-shell egg scrambler of claim 1, wherein said rotation unit is configured to spin said egg retention portion at a rate which is between 1500-4000 rpm and rapidly stops said rotation unit.

10. A method for scrambling an egg within said egg's shell, comprising rotating said egg rapidly, and
    using a sensor for recognizing that said egg is scrambled.

11. The method of claim 10, wherein said rotation is performed by accelerating the rotation from static to a predetermined velocity then stopping, for a predetermined amount of time or until said egg is scrambled.

12. The method of claim 11, wherein said rotation is done alternately clockwise and anticlockwise.

13. The method of claim 11, further comprising using a controller operative for activating rotation according to a predetermined amount of time, maximal velocity and direction.

14. A method for scrambling an egg within said egg's shell, comprising
    rotating said egg rapidly,
    using a sensor for recognizing that said egg is scrambled, and
    using an illumination source that is located near said egg's shell and using said sensor, that is located near the next side of said egg's shell, for sensing the change in transparency of said egg or the light color changes of the light, which is transmitted through said egg from said illumination source.

15. The method for scrambling an egg within said egg's shell according to claim 14, wherein said egg is rotated at a rate which is between 1500-4000 rpm.

* * * * *